US006369136B2

(12) United States Patent
Sorriero et al.

(10) Patent No.: US 6,369,136 B2
(45) **Date of Patent: *Apr. 9, 2002**

(54) ELECTROPHOTOGRAPHIC TONER BINDERS CONTAINING POLYESTER IONOMERS

(75) Inventors: Louis J. Sorriero, Rochester; Dinesh Tyagi, Fairport, both of NY (US)

(73) Assignee: Eastman Kodak Company, Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,902

(22) Filed: Dec. 31, 1998

(51) Int. Cl.$^7$ ............................ C08F 2/30; C08K 5/12; C08L 67/03

(52) U.S. Cl. ....................... 523/501; 523/502; 523/503; 523/504; 523/505; 523/507; 523/523; 523/526; 524/457

(58) Field of Search ................................ 524/161, 162, 524/169, 155, 457; 526/213; 523/501, 502, 503, 504, 505, 507, 523, 526

(56) References Cited

U.S. PATENT DOCUMENTS

| | | | | | |
|---|---|---|---|---|---|
| 2,229,513 | A | | 1/1941 | Lusting | |
| 3,018,272 | A | | 1/1962 | Griffing et al. | |
| 3,547,822 | A | | 12/1970 | Miller | |
| 3,563,942 | A | | 2/1971 | Heiberger | |
| 3,590,000 | A | | 6/1971 | Palmerti et al. | |
| 3,632,512 | A | | 1/1972 | Miller | |
| 3,681,106 | A | | 8/1972 | Burns et al. | |
| 3,734,874 | A | | 5/1973 | Kibler et al. | |
| 3,779,993 | A | * | 12/1973 | Kibler et al. | 260/75 S |
| 3,795,618 | A | | 3/1974 | Kasper | |
| 3,850,663 | A | | 11/1974 | Hagenbach | |
| 3,893,935 | A | | 7/1975 | Jadwin et al. | |
| 3,929,489 | A | | 12/1975 | Arcesi et al. | |
| 3,970,571 | A | | 7/1976 | Olson et al. | |
| 4,042,518 | A | | 8/1977 | Jones | |
| 4,076,857 | A | | 2/1978 | Kasper et al. | |
| 4,079,014 | A | | 3/1978 | Burness et al. | |
| 4,160,644 | A | | 7/1979 | Ryan | |
| 4,307,174 | A | | 12/1981 | Noonan et al. | |
| 4,323,634 | A | | 4/1982 | Jadwin | |
| RE31,072 | E | | 11/1982 | Jadwin et al. | |
| 4,394,430 | A | | 7/1983 | Jadwin et al. | |
| 4,414,152 | A | | 11/1983 | Santilli et al. | |
| 4,416,965 | A | | 11/1983 | Sandhu et al. | |
| 4,478,925 | A | | 10/1984 | Miskinis | |
| 4,486,524 | A | | 12/1984 | Fujisaki et al. | |
| 4,499,168 | A | | 2/1985 | Mitsuhashi | |
| 4,517,272 | A | | 5/1985 | Jadwin et al. | |
| 4,545,060 | A | | 10/1985 | Arnon | |
| 4,546,060 | A | | 10/1985 | Miskinis et al. | |
| 4,624,907 | A | | 11/1986 | Niimura et al. | |
| 4,683,188 | A | | 7/1987 | Suzuki et al. | |
| 4,726,994 | A | | 2/1988 | Yoerger | |
| 4,780,553 | A | | 10/1988 | Suzuki et al. | |
| 4,814,250 | A | | 3/1989 | Kwarta et al. | |
| 4,834,920 | A | | 5/1989 | Bugner et al. | |
| 4,840,864 | A | | 6/1989 | Bugner et al. | |
| 4,914,142 | A | * | 4/1990 | Takarbe et al. | 523/511 |
| 4,973,538 | A | | 11/1990 | Suzuki et al. | |
| 5,135,833 | A | | 8/1992 | Matsunaga et al. | |
| 5,192,637 | A | | 3/1993 | Saito et al. | |
| 5,411,832 | A | | 5/1995 | Yoerger | |
| 5,489,498 | A | | 2/1996 | Ohno et al. | |
| 5,681,677 | A | | 10/1997 | Bugner et al. | 430/58 |
| 5,709,975 | A | | 1/1998 | Yoerger et al. | |
| 5,733,695 | A | | 3/1998 | Molaire et al. | 430/58 |
| 5,849,822 | A | * | 12/1998 | Kido et al. | 524/159 |

FOREIGN PATENT DOCUMENTS

| | | |
|---|---|---|
| GB | 1420839 | 1/1976 |
| GB | 1501065 | 2/1978 |

OTHER PUBLICATIONS

Sorenson and Campbell. "Preparative Methods of Polymer Chemistry," 1st Ed., pp. 113–115, Interscience Publishers, 1968.

Sorenson and Campbell, "Preparative Methods of Polymer Chemistry," 1st Ed., pp. 162–163, Interscience Publishers, 1968.

* cited by examiner

*Primary Examiner*—David W. Wu
*Assistant Examiner*—Kelechi Egwing

(57) ABSTRACT

The present invention relates to a binder composition including a polymer formed from at least one vinyl type monomer and at least one water dispersible polyester-ionomer.

20 Claims, No Drawings

ELECTROPHOTOGRAPHIC TONER BINDERS CONTAINING POLYESTER IONOMERS

FIELD OF THE INVENTION

The present invention relates generally to the field of electrophotography. More particularly, it relates to polymeric compositions for use as binders in electrophotographic toners and developers, and to the process by which these polymeric compositions are prepared.

BACKGROUND OF THE INVENTION

In electrophotography, an image comprising a pattern of electrostatic potential (also referred to as an electrostatic latent image), is formed on a surface of an electrophotographic element and is then developed into a toner image by contacting the image with an electrographic developer. If desired, the latent image can be transferred to another surface before development. The toner image is eventually transferred to a receiver, to which it is fused, typically by heat and pressure. Electrophotographic toners must meet many system requirements. For example, for high process speeds the toner must meet certain demands; toners must have the ability to fuse at low fusing temperatures and also embody high melt strength. The combination of these two properties results in improved offset, large fusing latitudes, and extended fuser roller life.

Toners contain a binder and other optional additives, such as colorants and charge controlling agents. Binders are generally polymeric compositions selected so as to provide a balance between various conflicting constraints. For example, the chemical nature of the polymer composition should allow appropriate charging polarity and charge level for the toner incorporating the binder and yet exhibit sufficient compatibility with the receiving substrate to enhance the degree of adhesion. The problem often encountered is that binder compositions that are desirable for promoting adhesion to receiver substrates yield wrong charge sign toner particles or insufficient charge level, and vice versa. There are many polar monomers that can be used as comononers in polymer synthesis which possess specific affinity for the receiver substrate during the fusing. However, due to their polar nature these comononers also have a significant impact on the tribocharging behavior of the resulting toner particles.

Further, the polymer architecture needs to be optimized so as not to yield a very high melt viscosity of the toner incorporating the binder which can cause problems in grindability, and in fusing a toner image to a receiver. Enhanced grindability of a toner binder implies that the toner can be pulverized at a higher rate, which will lower the toner manufacturing cost. The fusing off-set latitude refers to the range of temperatures between the lowest temperature where the toner does not show cold offset, (or the lowest temperature at which toner fuses to the receiver substrate) and the highest temperature where the toner does not exhibit hot offset, (or highest temperature at which toner fuses to receiver without offsetting to the fuser roller).

In general, the grindability of a toner binder can be improved by lowering its molecular weight. However, the lowering of the molecular weight also impairs the rheological behavior of the toner binder. More specifically, the melt viscosity of the binder polymer is lowered and this results in reduced melt strength and a greater propensity for the toner to show fusing offset. Increases in molecular weight increase the melt strength, but the toner binder becomes both harder to grind and fuse. It is because of such competing requirements that toner binder properties are often compromised.

As materials suitable for providing adequate fusing to receiver substrate, polyesters resins have attracted significant attention. The use of low molecular weight polyester binders is described in U.S. Pat. Nos. 3,590,000 and 3,681,106. Toners prepared from low molecular weight polyester have limited fusing latitude since they adhere well to the receiver, but also adhere to the fuser surface.

In order to control the grindability of the polyester binders and also to control the melt rheological behavior of the polymeric binder, it is often possible to incorporate some branching or cross-linking to the polymer architecture. Examples of such binders are described in U.S. Pat. Nos. 5,135,833 and 5,489,498. Toners prepared with such cross-linked polyester resins exhibit reasonable fusing latitude, as their propensity for hot offset to fuser roller surface is reduced due to high melt elasticity of the toner binder. In addition, such resins can be readily pulverized.

However, polyester resins suffer from several drawbacks. First, the cost of the polyester resins is much higher than vinyl based toner binders. The cost of cross-linked polyesters is higher still. This difference is magnified further in high volume copiers/printers due to the large amounts of toner consumed as well as the need for higher fusing latitude required in high speed machines, which necessitates the use of cross-linked polyesters. Second, the specific gravity of the polyesters is higher than vinyl based polymers. Thus, based on volume, the cost of the toner goes up even further. Third, the polyesters form much more cohesive powders than vinyl polymers. As a result of higher cohesiveness, the powder flow characteristics of polyester resin based toners are fairly poor. In order to address the powder flow issue, it is often necessary to incorporate small amounts of inorganic oxide powders such as silica or titanium to the toner surface. Incorporating such surface treatment on the toner particles further increases toner cost.

Most vinyl polymer based toners are more cost effective due to lower binder cost. Moreover, the toners based on vinyl polymers do not suffer from powder flow concerns, as the vinyl polymers based binder polymers are tough and have higher Young's modulus than polyesters. However, the vinyl resin binders suffer from shortcomings associated with poor adhesion to receiver substrate. In addition, high molecular weight vinyl resin binders exhibit poor pulverizing behavior due to their toughness.

Often, the problems associated with pulverizing high molecular weight tough resin binders can be addressed by mixing a low molecular weight fraction with a high molecular weight fraction. This is taught by U.S. Pat. Nos. 4,973,538, to Suzuki et al; 4,486,524 to Fujisaki et al; 4,499,168 to Mitsuhashi; and 5,135,833 to Matsunaga et al. By controlling the ratio of the two molecular weight fractions, the rheological and grindability of the toner binder can be somewhat controlled. However, this approach does not provide satisfactory results if toners with higher melt elasticity are desired or if the molecular weight difference between the two distributions is very large. Further, the addition of low molecular weight fraction has a negative impact on the fusing latitude as the melt elasticity of the toner is lowered. Finally, the most severe shortcoming of low molecular weight fraction is that adhesion to the receiver substrate remains mostly unaffected because the surface energy remains the same.

Another problem with the above approach concerns the mixing of two polymers of different molecular weights and chemical compositions. Generally polyesters and styrenics are incompatible and exhibit macro-phase separation when melt blended with typical toner addenda such as colorants, charge control agents, and release addenda. Often, the resulting domains due to phase separation are larger than the desired toner particle size. This results in problems such as unacceptable developer stability and/or charging properties, poor developer flow properties, and toner batch to batch variations.

The use of high volume (high process speeds) electrophotographic copiers and or the need for full process color electrophotographic prints has increased the need for toners which are capable of being fused at lower temperatures. The demand for color engines has placed a premium on fusing quality as measured by image gloss and color clarity. Polyester as well as epoxy resins represent polymer classes that have the desired adhesive, melt-flow, and rheological properties that are suited for such applications. The problem with these materials is that they are more expensive than their styrenic counterparts, are fuser specific, and have poor particulate flow properties. On the other hand, styrenic polymers are inexpensive, have excellent particulate flow properties, but are less adhesive than polyester and therefore have poor fusing quality at comparable process speeds.

Hence, there exists a need for a toner binder resin which is more cost effective and which provides adequate adhesion to the receiver substrate. It is therefore highly desirable to provide toner binders in which the rheological properties reflect both those of styrenics as well as polyesters. Further, there is a need for a toner binder which fuses readily at high speeds.

SUMMARY OF THE INVENTION

The present invention provides a method for making an electrophotographic toner binder using a single-step reaction from which the resultant toner binder has both styrenic and polyester characteristics.

In one aspect of the invention there is provided a method of preparing an electrophotographic binder polymer comprising the steps of:

a) mixing together at least one vinyl type monomer and at least one polyester ionomer in an aqueous medium; and b) emulsion polymerizing the mixture from step a) to form polymeric latex particles.

Another aspect of the invention provides a method of preparing an electrophotographic toner comprising the steps of:

a) melt blending the polymeric latex particles formed in claim 1 with optional addenda to produce a melt product; and b) pulverizing the melt product to produce particles having a volume average particle size of from 4 to 15 micrometers.

In yet another aspect of the invention, there is provided:

a binder composition comprising a polymer formed from:

at least one vinyl type monomer; and at least one polyester-ionomer.

The instant invention is an improved and novel process which employs polyesters as stabilizers during the binder polymerization process. By preparing the toner binder by emulsion polymerization, toners prepared from the binder of the invention demonstrate advantages like low cost, improved rheological and adhesive properties which result in enhanced fusing quality. The polyester-ionomers function as protective colloids.

The use of polyester-ionomers produces an emulsion latex polymer of the desired micro-dispersed phases of the above mentioned polyester-ionomers. The polyester-ionomer phases are undetected by light microscope techniques and are therefore smaller than 0.1 microns ($\mu$) in diameter.

DETAILED DESCRIPTION OF THE INVENTION

As used herein the term "polyester-ionomers" refers to polyesters that contain ionic moieties in sufficient number to render the polyester water dispersible. These polyester are prepared by reacting one or more dicarboxylic acids or their functional equivalents such as anhydrides, diesters, or diacids with one or more diols in melt phase polycondensation techniques well known in the art. The ionic moieties required for water dispersibility may be included in the dicarboxylic or in the diol reactants, or in both. Procedures for the preparation of polyester-ionomers are described in U.S. Pat. Nos. 3,018,272; 3,563,942; 3,734,874; 3,779,993; 3,929,489; and 4,307,174.

The polyester-ionomers may be added to the aqueous phase or to the organic phase, preferably to both. They serve as the protective colloid during the polymerization reaction and render particulate stability to the resulting emulsion. Useful polyester-ionomers conform to structure (1):

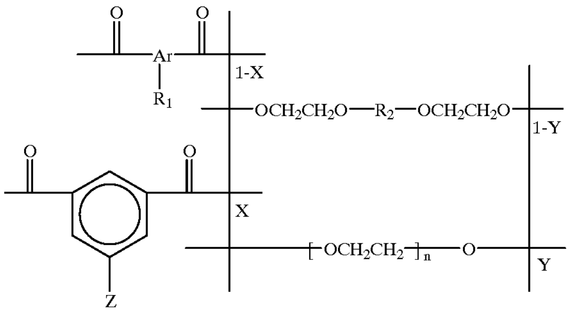

wherein

R1 represents alkyl groups with up to 8 carbon atoms, such as methyl and t-butyl;

R2 represents cyclohexyl, 1,4-dimethylenecyclohexane, 4,4'-benzophebnone, 4,4'-diphenylmethane, diphenylsulfone, 4,4'-isopropylidenebisphenylene, 4,4'-hexafluoroisopropylidene, 4,4'-cyclohexylidenebisphenylidene, 4,4'-norbornylidenebisophenylidene, 4,4'-indanylidene, and 4,4'-fluorenylidenebisphenylidene;

Ar represents 1,1,3-trimethyl-3-(4-carboxyphenyl)-5-indancarboxylate, 3-methylphthalic anhydride, isophthalic acid, terephthalic acid, and 5-t-butylisophthalic acid;

Z represents

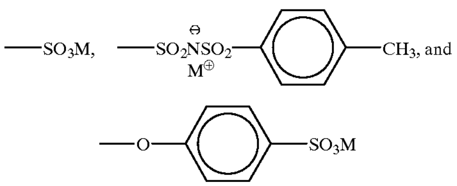

M represents any alkali earth metals such as lithium, sodium, or potassium. Additional cations may be selected from the following: ammonium, trimethylammonium, triethylammonium, hydroxylalkylammonium, and ditoluylphenylmethyl phosphonium;

n is an integer of from 2 to 12;

X represents 2.5 to 50 mole percent; and

Y represents 20 to 100 mole percent.

Useful polyester-ionomers according to structure (1) can be prepared by means of melt phase polycondensation techniques (Sorenson and Campbell, "Preparative Methods of Polymer Chemistry", 1st Ed., pages 113–115, Interscience Publishers, 1962), well known to those skilled in the art. The examples below are representative of some, but not all, of the polyester-ionomers variations that were evaluated. Those skilled in the art will recognize that the preparation is not limited to the use of diesters and diols. The polyester-ionomers could also be prepared from diacids, and diacetates along with the appropriate catalyst.

Toner binders prepared by emulsion polymerization are used in the field of electrophotography and have enjoyed great commercial success. The importance of aqueous emulsion latexes has increased in recent years since they result in toners which have significantly reduced volatile organic residues, they are relatively inexpensive to prepare, and they result in toners with excellent electrical properties.

Though high molecular weight polymers generally have acceptable melt strength and thus are resistant to hot offset, they are difficult to grind to the desired particle size and require increased energy to fuse to acceptable color gloss and clarity. Therefore, in the process of this invention, a chain transfer agent is preferably used to control the molecular weight and molecular weight distribution. The chain transfer agent is used alone or in conjunction with a crosslinking agent; with the latter combination being preferred since it results in increased molecular weight distribution.

The judicious selection of both levels of chain transfer agent, cross linking agent, as well as initiator allow one to control the molecular architecture and also the insoluble fraction of the resulting polymer. Careful use of these polymerization factors allow for the control of both polymer brittleness and rheology.

Chain transfer agents are known in the polymer art and any of the known compounds can be used. This invention is not selective of any specific chain transfer agent. Among the chain transfer agents that are useful in our process are linear or branched alkyl mercaptans having from 1 to 24 carbon atoms, or more, preferably from 4 to 14 carbon atoms; aryl mercaptans having from 6 to 14 carbon atoms; further, any of the other known types of chain transfer agents can be used provided they do not unduly interfere with the polymerization reaction. The concentration of chain transfer agent in the composition should be about 0.0 to 10.0, preferably 0.0 to 2.5, parts by weight per 100 parts of the total monomers.

The cross-linkers can be present in the organic phase (monomer droplets) and are present in a concentration range based upon vinyl monomer from 0.0 to 5.0, preferably 0.0 to 1.0 weight percent, with the proviso that there must be a concentration sufficient to obtain the desired polymer melt rheology. The invention is not specific to the type of crosslinker used and the list of acceptable crosslinkers should only be used as a general guide to the embodiments of the invention.

Among the suitable crosslinkers are divinylbenzene, acrylyl or methacryl polyester of polyhydroxylated compounds, divinyl esters of polycarboxylic acids, dialkyl esters, allyl methacrylates, and N,N'-methylene diacrylamides.

As indicated, the use of the chain transfer agents, and crosslinkers in the emulsion polymerizations according to the processes of this invention permit control of both the molecular weight and distribution so that toner binder compositions are obtained that have broader molecular weight distributions with controlled insoluble fraction. Those skilled in the are familiar with the emulsion polymerization process, the conventional reaction conditions, proportions thereof, catalyst, colorants, or other materials conventionally used.

Among the vinyl monomers that can be used in producing the binder polymer by the process of the instant invention are those containing at least one polymerizable carbon-to-carbon unsaturated bond. These compounds are well known in the art. Illustrative thereof are the unsaturated compounds such as butadiene, isoprene, chloroprene, styrene, vinyltoluene, 4-t-butylstyrene, chlororstyrene, fluorostyrene, acrylic acid, methacrylic acid, methylacrylate, methyl methacrylate, ethylacrylate, isopropyl methacrylate, butyl methacrylate, butyl acrylate, 2-ethylhexyl acrylate, 2-ethylhexyl methacrylate, vinylchloride, vinylidene chloride, and vinylpyridine. It is understood by those skilled in the art that any combination of these monomers may be employed in the present invention.

Useful styrenic copolymeric toner binders of the invention can be prepared by means of emulsion polymerization techniques (Sorenson and Campbell, "Preparative Methods of Polymer Chemistry", 1st. Ed., Chapter 4, pages 162–163. Interscience Publishers, 1962), well known to those skilled in the art.

The binder polymer of the invention preferably has a tetrahydrofuran (THF) insoluble fraction ranging from 0 percent to 75 percent by weight of the binder, which can be determined by insoluble fraction analysis. An insoluble fraction analysis can be performed by combining the binder and spectral grade THF so as to produce a 1% solution of the binder. This solution is stirred overnight. The resulting solution is then ultracentrifuged at 20,000 rpm for 3 hours and the supernatant is removed from the centrifuge tubes. About 5 grams of the supernatant is poured into a weighed aluminum dish and allowed to dry under vacuum at 80° C. The percentage of the binder that is insoluble (the "insoluble fraction" or "gel fraction") is determined by measuring the difference in the amount of dried polymer obtained in the dish and the amount present in a 1% solution.

The range of insoluble fraction present in the binder is related to the fusing quality of the toner comprising the binder as well as the gloss levels observed on fused toner images. If the insoluble fraction is from 0 to 75 percent, more preferably from 0 to 25 percent by weight of the total weight of the binder, then the toner comprising the binder will possess good fusing quality and desirable gloss levels.

The melt rheological behavior of the binder is influenced by its insoluble fraction and determines the hot offset propensity of the toner comprising the binder. (Hot offset refers to the unwanted transfer of the toner melt to the fuser member.) The desired rheological behavior for a toner melt is affected by the type of fusing sub-system geometry, type of materials selected for the fuser member surface and the fusing speed. The rheological behavior of the binder polymer in the molten state can be determined by using a dynamic mechanical rheometer such as RDA 700 manufactured by Rheometrics Inc. by analyzing the supernatant of the 1% THF solution described above. The complex melt viscosity (eta*) at 150° C. and 1 rad/sec frequency is preferably in the range of 5,000 to 300,000 poise for the binder. The preferred melt storage modulus (G') is from 5,000 to 275,000 dyne/cm$^2$ at 150° C. and 1 rad/sec frequency. The higher the melt storage modulus, the higher is the melt elasticity; therefore, toner comprising the binder will exhibit a greater fusing range without hot offset.

The fraction of these cross-linked copolymer toner resins which is soluble in THF can be characterized, e.g. the molecular weight distribution can be determined by size exclusion chromatography. The equivalent number average molecular weight of the soluble portion of the binder polymers is preferably from 5,000 to 60,000 and it is preferred that the largest peak in the molecular weight distribution curves corresponds to a peak molecular weight of 5,000 to 80,000. These values can be determined from a molecular weight distribution curve generated by size exclusion chromatography of the supernatant of the 1% THF solution described above. A calibration curve was prepared using polystyrene standards. Data below 37 mL elution volume was truncated to eliminate the very small molecular weight fractions in the polymer which might be due to the recombination product of the initiator.

The desired percent insolubility and molecular weight properties can be achieved by varying the composition and method of making the polymer binders, the reaction temperature, the proportions of monomers, crosslinking agent, initiator; and chain transfer agent, if present; and combinations of these variables. All of these adjustments can be made by those of skill in the polymer synthesis art to achieve the desired properties as set forth above.

In addition to the binder, the toner composition can comprise additional components. A preferred component of the toner is colorant: a pigment or dye. Suitable dyes and pigments are disclosed, for example, in U.S. Reissue Pat. No. 31,072 and in U.S. Pat. Nos. 4,160,644; 4,416,965; 4,414,152; and 2,229,513. One particularly useful colorant for toners to be used in black and white electrostatographic copying machines and printers is carbon black. Colorants are generally employed in the range of from about 0 to about 30 weight percent on a total toner powder weight basis, and preferably in the range of about 2 to about 15 weight percent.

Another preferred but optional component is a charge control agent. The term "charge control" refers to a propensity of a toner addenda to modify the triboelectric charging properties of the resulting toner. A very wide variety of charge control agents for positive charging toners are available. A large, but lesser number of charge control agents for negative charging toners are also available. Suitable charge control agents are disclosed, for example, in U.S. Pat. Nos. 3,893,935; 4,079,014; 4,323,634; 4,394,430 and British Patent Nos. 1,501,065; and 1,420,839. Charge control agents are generally employed in small quantities such as, from about 0.1 to about 5 weight percent based upon the weight of the toner. Additional charge control agents which are useful are described in U.S. Pat. Nos. 4,624,907; 4,814,250; 4,840,864; 4,834,920; 4,683,188 and 4,780,553. The currently preferred charge control agent is described in U.S. Pat. No. 4,624,907 and has the structure:

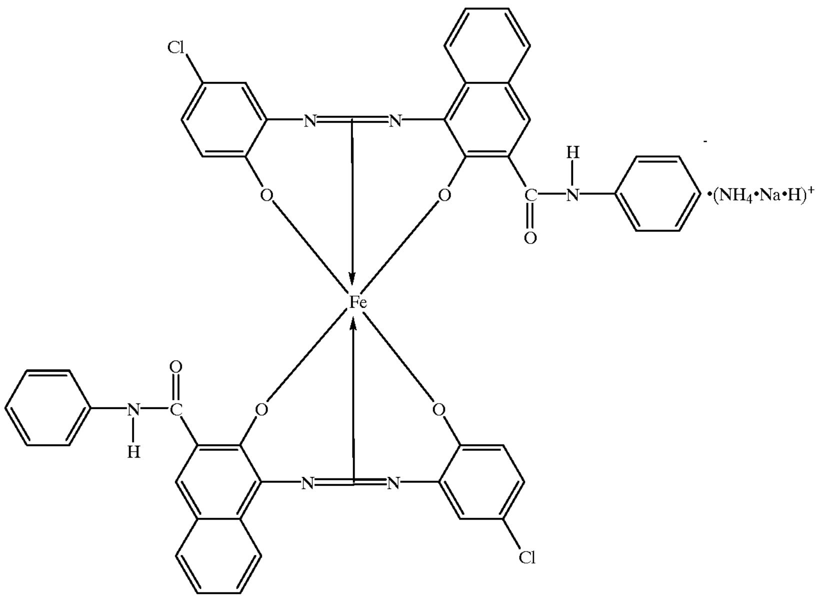

The toner can also contain other additives of the type used in previous toners, including magnetic pigments, leveling agents, surfactants, stabilizers, and the like. The total quantity of such additives can vary. A present preference is to employ not more than about 10 weight percent of such additives on a total dry toner composition weight basis. However, in the case of MICR (magnetic ink character recognition) toners and monocomponent toners, the weight percent of iron oxide can be as high as 60% by weight. In a particular embodiment of the invention, a waxy or olefinic additive is used at a concentration of about 0 to 5 weight percent relative to the weight of binder. A preferred additive of this type is a low molecular weight polypropylene wax such as a commercially available wax as VISCOL™ from Sanyo Chemical Corporation as well as the ethylene homopolymers and copolymers available from Baker-Petrolite Corporation.

Toners can optionally incorporate a small quantity of low surface energy material, as described in U.S. Pat. No. 4,517,272. These references were cited above, because they relate to the use of silicone additives to reduce hollow character. While not necessary for the present invention, they may provide some improvement. Optionally the toner can contain a particulate additive on its surface such as the particulate additive disclosed in U.S. Pat. No. 5,192,637.

The toners of this invention can be used in monocomponent or two-component developer compositions. The toner particles in a monocomponent developer are formulated like the toners in a two-component developer, except that the toners for monocomponent developers typically comprise a magnetic additive. The monocomponent developer comprising the toner achieves the desired triboelectric charge and transports itself around the magnetic brush without a second type of particle in the developer composition. Two-component developers comprise toner particles and carrier particles. Carriers can be conductive, non-conductive, magnetic, or non-magnetic. Examples of carriers include glass beads; crystals of inorganic salts, such as aluminum potassium chloride, ammonium chloride, or sodium nitrate; granules of zirconia, silicon, or silica; particles of hard resin such as poly(methyl methacrylate); and particles of elemental metal or alloy or oxide such as iron, steel, nickel, carborundum, cobalt, oxidized iron and mixtures of such materials. Additional examples of carriers are disclosed in U.S. Pat. Nos. 3,850,663 and 3,970,571. Especially useful carriers in magnetic brush development procedures are iron particles such as porous iron, particles having oxidized surfaces, steel particles, and other "hard" and "soft" ferromagnetic materials such as gamma ferric oxides or ferrites of barium, strontium, lead, magnesium, or aluminum. Such carriers are disclosed in U.S. Pat. Nos. 4,042,518; 4,478,925; and 4,546,060.

Carrier particles can be uncoated or can be coated with a thin layer of a film-forming resin to establish the correct triboelectric relationship and charge level with the toner employed. Examples of suitable resins are the polymers described in U.S. Pat. Nos. 3,547,822; 3,632,512; 3,795,618 and 3,898,170 and Belgian Patent No. 797,132. Other useful resins are fluorocarbons, such as, polytetrafluoroethylene, poly(vinylidene fluoride), mixtures of these, and copolymers of vinylidene fluoride and tetrafluoroethylene. See for example, U.S. Pat. Nos. 4,545,060; 4,478,925; 4,076,857; 3,970,571; and 4,726,994. Polymeric fluorocarbon coatings can shift the coated carrier particles to a position in the triboelectric series different from that of the uncoated carrier core material to adjust the degree of triboelectric charging of both the carrier and toner particles. The polymeric fluorocarbon coatings can also reduce the frictional characteristics of the carrier particles in order to improve developer flow properties. These polymeric fluorocarbons are also used other reasons such as to reduce the surface hardness of the carrier particles, to reduce carrier particle breakage and abrasion on the photoconductor and other components, to reduce the tendency of toner particles or other materials to undesirably permanently adhere to the carrier particles, and to alter the electrical resistance of the carrier particles.

In an embodiment of the invention, the carrier can be strontium ferrite coated with 0.5 percent by weight fluorocarbon based on the weight of the carrier, and treated with an aqueous solution of 4 weight percent KOH and 4 weight percent of a 2 parts by weight to 1 parts by weight mixture of $Na_2S_2O_8$ and $Na_2S_2O_5$ as disclosed in U.S. Pat. No. 5,411,832 by William E. Yoerger, which is hereby incorporated herein by reference. Another useful carrier is a strontium ferrite core coated with silicone resin as described in U.S. Pat. No. 5,709,975 by William E. Yoerger et al, which is hereby incorporated herein by reference.

The toner composition of this invention can be made by melt processing the polymer binder in for example a two roll mill or extruder. This procedure can include melt blending of other materials with the polymer, such as toner addenda and colorants. A performed mechanical blend of the binder polymer, colorants and other toner additives can be prepared, and then roll milled or extruded. The roll milling, extrusion, or other melt processing is performed at a temperature sufficient to achieve a uniformly blended composition. The resulting material, referred to as a "melt product" or "melt slab" is then cooled. For a polymer having a Tg in the range of about 50° C. to about 120° C., or a $T_m$ in the range of about 65° C. to about 200° C., a melt blending temperature in the range of about 90° C. to about 240° C. is suitable using a roll mill or extruder. Melt blending times, that is, the exposure period for melt blending at elevated temperature, are in the range of about 1 to about 60 minutes.

The melt product is cooled and then pulverized to a volume average particle size of from about 4 to 20, preferably 5 to 12 micrometers. It is generally preferred to first grind the melt product prior to a specific pulverizing operation. The grinding can be carried out by any convenient procedure. For example, the solid composition can be crushed and then ground using, for example, a fluid energy or jet mill, such as described in U.S. Pat. No. 4,089,472, and can then be classified in one or more steps.

The toner composition of this invention can alternatively be made by dissolving the polymer in a solvent in which the charge control agent and other additives are also dissolved or are dispersed. The resulting solution can then be spray dried to produce particulate toner powders. Methods of this type include limited coalescence polymer suspension procedures as disclosed in U.S. Pat. No. 4,833,060 which are particularly useful for producing small, uniform toner particles.

The term "particle size," "size," or "sized" as used herein in reference to the term "particles", means the median volume weighted diameter as measured by conventional diameter measuring devices, such as a Coulter Multisizer, sold by Coulter, Inc. of Hialeah, Fla. The median volume weighted diameter is the diameter of an equivalent weight spherical particle which represents the median for a sample.

In the preferred embodiments, the toner is part of a two-component developer which comprises from about 1 to about 20 percent by weight of toner and from about 80 to about 99 percent by weight of carrier particles. Usually, carrier particles are larger than toner particles. Carrier particles can have a particle size of from about 5 to about 1200 micrometers and are generally from 5 to 200 micrometers, whereas the toner particles preferably have a size from 4 to 20 microns. The developer can be made by simply mixing the toner and the carrier in a suitable mixing device. The components are mixed until the developer achieves a maximum charge. Useful mixing devices include roll mills and other high energy mixing devices.

The developer comprising the toner of the invention can be used in a variety of ways to develop electrostatic charge patterns or latent images. Such developable charge patterns can be prepared by a number of methods and are then carried by a suitable element. The charge pattern can be carried, for example, on a light sensitive photoconductive element or a non-light-sensitive dielectric surface element, such as an insulator coated conductive sheet. One suitable development technique involves cascading developer across the electrostatic charge pattern. Another technique involves applying toner particles from a magnetic brush. This technique involves the use of magnetically attractable carrier cores. After imagewise deposition of the toner particles the image can be fixed, for example, by heating the toner to cause it to fuse to the receiver carrying the toner. If desired, the unfused image can be transferred to a receiver such as a blank sheet of copy paper and then fused to form a permanent image.

The invention is further illustrated by the following examples.

Binder polymers of the invention were prepared as follows:

EXAMPLES

Preparation of Polyester Ionomers

Polyester-ionomer A

Poly[4,4-xylylene-co-[2.2'-oxydiethylene Isophthalate-co-5-sodiosulfoisophthalate sodiosulfoisophthalate.

Polyester-ionomer A was prepared as follows: 159.08 grams (0.82 moles) of dimethylisophthlate, 53.28 grams (0.18 moles) of dimethyl-5-sodiosulfoisophthalate, 92.74 grams (0.644 moles) of cyclohexanedimethanol, and 80.14 grams (0.756 moles) of 2,2'-oxydiethanol, and 100 ppm titanium catalyst were combined in a polymerization flask equipped with a nitrogen bubbler, Claisen head, and thermometer. The contents were placed in a salt bath at 200° C. to achieve a homogenous melt and interchanged over a temperature range from 200° C. to 240° C. for a period of 3 hours. The flask was the equipped with a stirred, connected to a vacuum source, and the polycondensation step was performed at 240° C. until the desired melt viscosity as monitored by stirrer torque was achieved. The resulting polyester ionomer had a Tg of 54° C., an IV/DCM of 0.28 dl/g, and a polystryene equivalent molecular weight of 39,000.

Polyester-ionomer B

Poly[4,4-xylylene-co-2,2'-oxydiethylene Isophthalate -co-5-sodiosulfoisophthalate]

Polyester-ionomer B was prepared as per polyester-ionomer A except that 184.3 grams (0.95 moles) of dimethylisophthalate and 14.8grams (0.05 moles) of dimethyl-5-sodiosulfoisophthalate were employed as the diester components. The resulting polyester-ionomer had a Tg of 34° C., IV/DCM of 0.27 dl/g, and a polystyrene equivalent molecular weight of 24,600.

Polyester-ionomer C

Poly[4,4-xylylene-co-2,2'-oxydiethylene isophthalate-co-5-sodiosulfoisophthalate].

Polyester-ionomer C was prepared in the same manner as polyester-ionomer A except that 174.6 grams (0.90 moles) of dimethyl isophthalate and 29.6 grams (0.10 moles) dimethyl-5-sodiosulfoisophthalate were employed as the diester components. The resulting polyester-ionomer had a Tg of 38° C., IV/DCM of 0.18 dl/g, and a polystyrene equivalent molecular weight of 22,000.

Polyester-ionomer D

Poly[ 4,4-xylylene-co-2,2'-oxdiethylene Isophthalate-co-5-sodiosulfoisophthalate].

Polyester-ionomer D was prepared in the same manner as polyester-ionomer A except that 164.9 grams (0.85 moles) of dimethylisophthalate and 44.4 grams (0.15 moles) of dimethyl-5-sodiosulfoisophthalate were employed as the diester components. The resulting polyester-ionomer had a Tg of 42° C., an IV/DCM of 0.15 dl/g, and a polystyrene equivalent molecular weight of 24,000.

Polyester-ionomer E

Poly[2,2'-oxydiethylene-co-ethylene Isophthalate-co-5-sodiosulfoisophthalate].

Polyester-ionomer E was prepared in the same fashion as example ionomer A except that 170.72 grams (0.88 moles) of dimethylisophthalate, 35.52 grams (0.12 moles) of dimethyl-5-sodiosulfoisophthalate, 126.14 grams (1.19 moles) of 2,2'-oxydiethanol, and 17.36 grams (0.28 moles) of ethylene glycol were combined as per sample ionomer A. The resulting polymer had a polystyrene equivalent molecular weight of 32,000 and a Tg of 36° C.

Polyester-ionomer F

Poly[2,2'oxydiethylene Isophthalate-co-5-sodiosulfoisophthalate].

Polyester-ionomer F was prepared as per example ionomer A except that 148.4 grams (1.40 moles) of 2,2'-oxydiethanol, 170.72 grams (0.88 moles) of dimethylisophthalate, and 35.52 grams (0.12 moles) of ethylene glycol were combined as per sample ionomer A. the resulting polymer had a polystyrene equivalent molecular weight of 28,000 and a Tg of 28° C.

Useful polyester-ionomers may range in polystyrene equivalent weight average molecular weights measured by size exclusion chromatography (SEC) from 1500 to 100,000 and preferably from 5,000 to 50,000 and exhibit glass transition temperature form 20° C. to 100° C.

Preparation of Binder Polymers Comprising Polyester Ionomers

Toner Polymer A

Poly[styrene-co-butylacrylate]

This example was prepared in the same fashion as Comparative Toner Polymer I except that 50 grams of a Polyester-ionomer A was added to the aqueous phase of the mixture. The resulting polymer was found to have a polystyrene equivalent molecular weight of 145,000 and a Tg of 61° C.

Toner Polymer B

Poly[styrene-co-butylacrylate]

Toner Polymer B was prepared in the same fashion as Toner Polymer A except that 25 grams of Polyester-ionomer A was added to the "pot" solution and 25 grams of Polyester-ionomer A was added to the mixture. The resulting contents were then polymerized and isolated in the fashion resulting in a product having a polystyrene equivalent molecular weight of 165,000 and a Tg of 60° C.

Toner Polymer C

Poly[ styrene-co-butylacrylate]

Toner Polymer C was prepared in the same fashion as Toner Polymer A except that 33 grams of Polyester-ionomer A was added to the "pot" solution and 33 grams of Polyester-ionomer A was added to the "header" mixture. The resulting emulsion was polymerized and isolated in the same fashion resulting in a product having a polystyrene equivalent molecular weight of 155,000 and a Tg of 59° C.

Toner Polymer D

Poly[styrene-co-butylacrylate-co-hydroxyethylacrylate]

Toner Polymer D was prepared in the same fashion as Toner Polymer A except that 12.5 grams of styrene was replaced with the same amount of 2-hydroxyethylacryalte. The resulting emulsion was polymerized and isolated in the same fashion resulting in a product having a polystyrene equivalent molecular weight of 225,000 and a Tg of 62° C.

Toner Polymer E

Poly[ styrene-co-butylacrylate-co-divinylbenzene]

Toner Polymer E was prepared in the same fashion as Toner Polymer A except that 0.75 grams of styrene were replaced with the same amount of divinylbenzene. The resulting emulsion was polymerized and isolated in the same fashion resulting in a product having an insoluble fraction of 5% and a Tg of 60° C.

Comparative Toner Polymer I

Poly [styrene-co-butylacrylate]

700 ml of distilled water, 2 grams of sodium carbonate, 5 grams of potassium persulfate, 2.5 grams of sodium bisulfate, and 1.5 grams of Alipal CO436 were combined in a three neck, three liter round bottom flask equipped with stirrer, water cooled condenser, and nitrogen bubbler. The contents were heated to 80° C. under a positive nitrogen atmosphere. The header mixture was prepared by emulsifying 187.5 grams of styrene and 62.5 grams of butylacrylate into 300 ml of water containing 2.09 grams of sodium carbonate and 1.0 grams of Alipal CO436. The resulting emulsion was then added in a dropwise fashion to the solution already in the above three liter flask over a period of an hour. The resulting chalky white latex was allowed to polymerize at 80° C. for an additional 16 hours. The contents were then devolatilized, cooled, coagulated and collected by filtration. The isolated polymer was then vacuum oven dried at 50° C. and was found to have a polystryene equivalent weight average molecular weight of 150,000 and a glass transition temperature (Tg) of 62° C.

Comparative Toner Polymer II

For comparative purposes, commercially available resin sold by Kao under the trade name Kao Resin N was used as the toner binder. The binder is based on bis-phenol A and is slightly cross-linked. The weight average molecular weight of this low acid binder was found to be 107,000. The glass transition temperature (Tg) was 65° C. with an acid value of 3.0 mg KOH/gram.

TABLE 1

| Toner Polymer | <Mn> | <Mw> | % Insoluble | Tg(° C.) | Melt Viscosity (poise) |
|---|---|---|---|---|---|
| Comparative I | 4,300 | 160,000 | 0 | 59 | 32,000 |
| Comparative II | 3700 | 107,000 | 2 | 60.6 | 6,500 |
| Toner Poly. A | 4,100 | 150,000 | 0 | 62 | 26,000 |
| Toner Poly. B | 4,000 | 165,000 | 0 | 61 | 32,000 |
| Toner Poly. C | 4,200 | 155,000 | 0 | 59 | 70,000 |
| Toner Poly. D | 9,800 | 225000 | 0 | 62 | 108,000 |
| Toner Poly. E | — | — | 5 | 60 | 56,000 |

Toner Preparation

Negative charging toners were prepared as follows. A dry blend was prepared of 50.0 grams of the polymers described in Table 1 with 3.5 grams of Black Pearls 430™ carbon black, marketed by Cabot Corporation, and 1.25 grams of Hodogaya T-77 charge controlling agent. The dry blend was added to a heated two-roll compounding mill. The roller surface temperatures were set to 150° C. The melt was exercised on the roll mill for 20 minutes, then was removed and cooled. The resulting melt slab was first coarse ground to 2 mm size on a laboratory mill, then finely pulverized to approximately 10 micrometers size on a Trost TX jet mill.

A list of toner samples prepared using the procedures described above is provided in Table 2.

TABLE 2

| Toner | Polymer | Carbon | CCA |
|---|---|---|---|
| Comparative Ex. A | Comparative Toner Polymer I | 7 pph B.P. 430 | 2.5 pph T-77 |
| Comparative Ex. B | Comparative Toner Polymer II | 7 pph B.P. 430 | 2.5 pph T-77 |
| Example C | Toner Polymer B | 7 pph B.P. 430 | 2.5 pph T-77 |
| Example D | Toner Polymer C | 7 pph B.P. 430 | 2.5 pph T-77 |
| Example E | Toner Polymer E | 7 pph B.P. 430 | 2.5 pph T-77 |

Developers were prepared for these toners indicated above, by mixing toner particles prepared as described above at a weight concentration of 10 weight percent toner with carrier particles comprising strontium ferrite cores thinly coated with (approximately 2 percent by weight) with silicone resin. The volume average particle size of the carrier particles was from 25 to 52 micrometers.

The developers described above were used to develop toner patch on a paper surface. The toner laydown coverage was approximately 120 milligrams/square meter. The patches were used to examine the fusing behavior of the toner resins of this invention.

The toner laydown patches were fused in a fuser subassembly of an EK95 copier. The fuser is equipped with a hard Teflon fuser roller surface. The back-up pressure roller has a compliant rubber surface. The fusing experiments were carried out at 200° C. at varying fuser speeds. The fusing speeds were varied from 0.075meter/sec to 0.60 meter/sec. In this test, a good fusing toner would provide good fusing performance at high fuser speeds, where the nip time available for heating the toner particles is small. Conversely a poor fusing toner would exhibit poor quality at high speeds. At low fusing speeds the fusing differences are small since there would be sufficient heat available to fuse toner particles adequately. Any difference in the low speed performance observed in the hot offset behavior of the toners particles would be due primarily to the differences in the melt elasticity of the toner melts. If desired, the melt elasticity can be easily optimized by controlling the molecular architecture and molecular weights of the toner binder resin.

A tape-transfer test was employed to evaluated the respective toner fusing properties. The fused images of comparable density are contacted with adhesive tape and the tape is removed. The image density difference before and after being exposed to the adhesive tape is recorded. This density change is then converted into a percent density remaining as image. Therefore, the greater the value recorded, the better the fused image has adhered to the receiver. The test is performed at various speeds and therefore over a range of shear rates. This allows for the determination of the toners dynamic fusing range. The toner melt strength is sensitive to slower roller speeds, while the toner adhesive properties (fusing quality) respond to the faster roller speeds. Tape-transfer results for toner variants of interest are given in Table 3.

TABLE 3

| Toner | Polmer | PEI* | Tape Transfer Speed (meter/second) @ 200° C. | | | | |
|---|---|---|---|---|---|---|---|
| Sample | Binder | Content | 0.075 | 0.150 | 0.3 | 0.45 | 0.60 |
| Comp. Exam. A | Compara. Toner Polymer I | — | H** | 70 | 50 | 40 | 10 |

TABLE 3-continued

| Toner | Polmer | PEI* | Tape Transfer Speed (meter/second) @ 200° C. | | | | |
|---|---|---|---|---|---|---|---|
| Sample | Binder | Content | 0.075 | 0.150 | 0.3 | 0.45 | 0.60 |
| Comp. Exam. B | Compara. Toner Polymer II | — | H** | H** | 99 | 97 | 50 |
| Exam. C | Toner Polymer B | 2.5 | 85 | 70 | 60 | 50 | 40 |
| Exam. D | Toner Polymer C | 5.0 | 95 | 85 | 70 | 60 | 50 |
| Exam. E | Toner Polymer E | 5.0 | 99 | 99 | 95 | 70 | 60 |

• PEI; polyester-ionomer
• **H; toner hot offset observed

The results in Table 2 demonstrate the fusing advantage observed with the toners of the invention. Comparative example B, a polyester resin, demonstrates superior fusing quality but has unacceptable toner hot offset properties. Comparative example A, a linear styrene-acrylic, exhibits both poor fusing quality as well as unacceptable hot offset resistance. The toners of the invention, examples C, D, and E all have small amounts of polyester character and exhibit a significant improvement in both fusing quality as well as resistance to hot offset. Toner example D, of the invention, is superior in performance when compared to comparative example A which consist of a polyester binder. Toner example D exhibits both superior fusing quality as well as hot offset resistance. All of these binders of this invention exhibit excellent fusing performance and fuser roller hot off-set behavior. These binders not only have the fusing quality similar to the polyester binder based toners, but also exhibit better hot off-set performance against the fuser roller surface. Since the majority of the binder composition is still styrenic, the improved performance is realized without incurring higher cost associated with all polyester toner binder. Additionally, these binders of invention have powder flow similar to the other vinyl polymers. The specific gravity of these toners is also similar to vinyl toners, hence a larger volume of the toners particles can be prepared with each unit weight.

The invention has been described in detail with particular reference to certain preferred embodiments thereof, but it will be understood that variations and modifications can be effected within the spirit and scope of the invention.

What is claimed is:

1. A binder composition comprising:

a polymer formed from at least one vinyl type monomer in the presence of at least one water dispersible polyester-ionomer comprising repeating units of the formula:

$$-[X]-[Y]-$$

wherein X is, independently, A or C, and C represents 2.5 to 50 mole percent of the total of A and C; and Y is, independently, B or D, and D represents 20 to 100 mole percent of the total of B and D;

where:

A represents

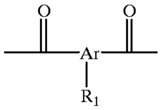

B represents:

$$-OCH_2CH_2O-_{R_2}-OCH_2O-$$

C represents:

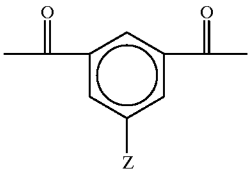

D represents:

$$-[OCH_2CH_2]_n-O-$$

wherein:

$R_1$ represents an alkyl group with up to 8 carbon atoms;

$R_2$ represents a cyclohexyl, 1,4-dimethylenecyclohexane, 4,4'-benzophebnone, 4,4'-diphenylmethane, diphenylsulfone, 4,4'-isopropylidenebisphenylene, 4,4'-hexafluoroisopropylidene, 4,4'-cyclohexylidenebisphenylidene, 4,4'-norbornylidenebisophenylidene, 4,4'-indanylidene, or 4,4'-fluorenylidenebisphenylidene group;

Ar represents a 1,1,3-mmethyl-3-(4-carboxyphenyl)-5-indancarboxylate, 3-methylphthalic anhydride, isophthalic acid, terephthalic acid, or 5-t-butylisophthalic acid group;

Z represents

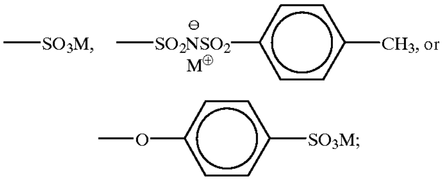

M represents lithium, sodium, potassium, ammonium, trimethylammonium, triethylammonium, hydroxyalkylammonium, or ditoluylphenylmethyl phosphonium; and n is an integer of from 2 to 12.

2. A binder composition comprising:

a polymer formed from at least one vinyl type monomer in the presence of at least one inert water dispersible polyester-ionomer comprising repeating units of the formula:

$$-[X]-[Y]-$$

wherein X is, independently, A or C, and C represents 2.5 to 50 mole percent of the total of A and C; and Y is, independently, B, or D, and D represents 20 to 100 mole percent of the total of B and D;

where:

A represents:

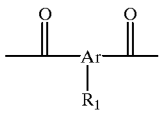

B represents:

$—OCH_2CH_2O—_{R2}—OCH_2CH_2O—$

C represents;

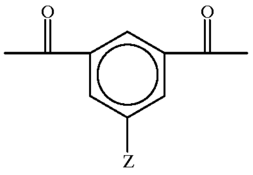

D represents:

$—[OCH_2CH_2]_n—O—$ wherein:

$R_1$ represents an alkyl group with up to 8 carbon atoms;

$R_2$ represents a cyclohexyl, 1,4-dimethylenecyclohexane, 4,4'-benzophebnone, 4,4'-diphenylmethane, diphenylsulfone, 4,4'-isopropylidenebisphenylene, 4,4'-hexafluoroisopropylidene, 4,4'-cyclohexylidenebisphenylidene, 4,4'-norbornylidenebisophenylidene, 4,4'-indanylidene, or 4,4'-fluorenylidenebisphenylidene group;

Ar represents a 1,1,3-trimethyl-3-(4-carboxyphenyl)-5-indancarboxylate, 3-methylphthalic anhydride, isophthalic acid, terephthalic acid, or 5-t-butylisophthalic acid group;

Z represents $—SO_3M$, 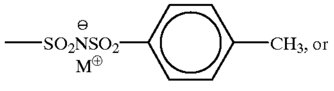 or

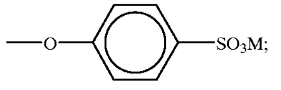

M represents lithium, sodium, potassium, ammonium, trimethylammonium, triethylammonium, hydroxyalkylammonium, or ditoluylphenylmethyl phosphonium; and n is an integer of from 2 to 12.

3. The binder composition of claim 2 wherein the at least one vinyl type monomer and the at least one polyester-ionomer are mixed and the monomers are emulsion polymerized to form polymeric latex particles.

4. The binder composition of claim 1 wherein the at least one vinyl type monomer is a styrene, a vinyl toluene, an alpha-methylstyrene, a methylstyrene, an n-alkylacrylate, an alkyl methacrylate, a butadiene, an unsubstituted or a substituted monocarboxylic acid having a double bond, an olefin, a vinyl ketone, or a vinyl ether.

5. A toner composition comprising: a binder according to claim 1 and optional addenda.

6. At least one toner particle comprising: a binder according to claim 1 wherein the vinyl type monomer and the polyester-ionomer are mixed, emulsion polymerized, melt blended and pulverized, in that order, to form the toner particle.

7. The toner composition of claim 5 wherein the optional addenda are selected from the group consisting of colorant, charge control agent, magnetic pigment, leveling agent, surfactant, stabilizer, and low surface energy material.

8. The binder composition of claim 1 wherein the concentration of polyester ionomer is between 0.25 and 15.0 parts by weight per 100 parts by weight of the total monomers.

9. The binder composition of claim 1 wherein the concentration of polyester ionomer is between 0.5 and 5.0 parts by weight per 100 parts by weight of the total monomers.

10. A toner comprising the binder composition of claim 1 wherein a concentration of vinyl type copolymer is between 70 and 99.5 parts by weight per 100 parts by weight of a total toner weight.

11. The binder composition of claim 1 further comprising an optional cross-linker at a concentration between 0.0 and 5.0 parts by weight per 100 parts by weight of the total monomers.

12. The binder composition of claim 1 further comprising an optional chain transfer agent at a concentration between 0.0 and 10.0 parts by weight per 100 parts by weight of the total monomers.

13. The toner composition of claim 5 comprising toner particles having a volume average particle size between 4 and 20 micrometers.

14. The binder composition of claim 1 further comprising a cross-liner that is a divinylbenezene, an acrylyl or a methacryl polyester of a polyhydroxylated compound; a divinyl ester of a polycarboxylic acid; a dialkyl ester; an allyl methacrylate; or a N,N'-methylene diacrylamide.

15. The binder composition of claim 1 further comprising a chain transfer agent is a linear or a branched alkyl mercaptan having from 1 to 24 carbon atoms or an aryl mercaptan having from 6 to 14 carbon atoms.

16. The binder composition of claim 1 further comprising a tetrahydrofuran insoluble fraction of not more than 75 percent by weight of the binder.

17. The binder composition of claim 1 wherein the composition has a complex melt viscosity ranging from 5,000 to 300,000 poise and a melt storage modulus ranging from 5,000 to 275,000 dyne/$cm^2$ at 150° C. and 1 rad/sec frequency.

18. A toner comprising the binder of claim 1.

19. The binder composition of claim 1 wherein R1 is methyl or t-butyl,

20. The binder composition of claim 1 wherein the polyester-ionomer is a protective colloid.

* * * * *